US011835128B2

United States Patent
Zulauf et al.

(10) Patent No.: US 11,835,128 B2
(45) Date of Patent: Dec. 5, 2023

(54) PROCESS FOR THE ADJUSTMENT OF BACKLASH BETWEEN A PINON AND A RACK IN A RACK-PINION DRIVE

(71) Applicant: Güdel AG, Langenthal (CH)

(72) Inventors: Walter Zulauf, Ursenbach (CH); Stefan Baumann, Aeschi (CH); Christof Ackermann, Wolfwil (CH)

(73) Assignee: Güdel AG, Langenthal (CH)

( * ) Notice: Subject to any disclaimer, the term of this patent is extended or adjusted under 35 U.S.C. 154(b) by 12 days.

(21) Appl. No.: 17/637,574

(22) PCT Filed: Jul. 22, 2020

(86) PCT No.: PCT/EP2020/070700
§ 371 (c)(1),
(2) Date: Feb. 23, 2022

(87) PCT Pub. No.: WO2021/037448
PCT Pub. Date: Mar. 4, 2021

(65) Prior Publication Data
US 2022/0275859 A1      Sep. 1, 2022

(30) Foreign Application Priority Data
Aug. 27, 2019   (EP) .................................. 19193843

(51) Int. Cl.
*F16H 57/12*   (2006.01)
*F16H 19/04*   (2006.01)

(52) U.S. Cl.
CPC ............. *F16H 57/12* (2013.01); *F16H 19/04* (2013.01); *F16H 2019/046* (2013.01); *F16H 2057/123* (2013.01); *F16H 2057/125* (2013.01)

(58) Field of Classification Search
CPC .... F16H 57/12; F16H 19/04; F16H 2019/046; F16H 2057/123; F16H 2057/125; F16H 55/28
See application file for complete search history.

(56) References Cited

U.S. PATENT DOCUMENTS 4,550,626 A  *  11/1985  Brouwer ................ B23Q 5/385
                                                              74/395
5,609,058 A  *  3/1997   Gnadt ................... B23F 19/025
                                                              33/501.8
(Continued)

FOREIGN PATENT DOCUMENTS

EP         0 763 193 A1     3/1997
WO   WO 2016/198099 A1     12/2016

OTHER PUBLICATIONS

International Search Report from International Application No. PCT/EP2020/070700, dated Sep. 14, 2020.

*Primary Examiner* — Ryan J. Walters
(74) *Attorney, Agent, or Firm* — Davidson, Davidson & Kappel, LLC

(57) ABSTRACT

In a process for the adjustment of backlash between a pinon (20) and a rack (10) in a rack-pinion drive, a motor-gearbox assembly (30) including a motor and a gearbox is supported on a carrier (40) via a positioning mechanism (42) for precisely positioning the assembly (30) in a radial position relative to the rack (10). In the process, the assembly (30) is positioned in a first radial distance relative to the rack (10), using the positioning mechanism (42) and a first circumferential backlash between the pinon (20) and the rack (10) is determined at a first position of the pinion (20) along the rack (10), based on measurements taken on an input side of the gearbox. Then, the assembly (30) and/or the rack (10) are positioned in a second position of the pinion (20) along the rack (10), different from the first position, and a second (Continued)

circumferential backlash between the pinon (20) and the rack (10) is determined at the second position, based on measurements taken on the input side of the gearbox A minimal circumferential backlash is determined from the determined first circumferential backlash and the determined second circumferential backlash (and possibly further measurements), and a radial adjustment distance is determined based on the determined minimal circumferential backlash. Finally, the motor-gearbox assembly (30) is repositioned in a radial direction, towards the rack (10), by the determined radial adjustment distance, using the positioning mechanism (42).

10 Claims, 3 Drawing Sheets

(56) References Cited

U.S. PATENT DOCUMENTS

| | | | |
|---|---|---|---|
| 7,591,204 B2 * | 9/2009 | Ueno | B62D 5/0409 |
| | | | 74/388 PS |
| 9,815,161 B2 * | 11/2017 | Lin | B23Q 5/56 |
| 10,161,504 B2 * | 12/2018 | DiSabatino | F16H 57/12 |
| 10,197,988 B2 * | 2/2019 | Kim | G05B 19/404 |
| 2003/0101834 A1 | 6/2003 | Huang | |
| 2005/0121251 A1 | 6/2005 | Ueno et al. | |
| 2007/0034033 A1 * | 2/2007 | Nozue | E02F 9/0808 |
| | | | 74/409 |
| 2014/0039666 A1 | 2/2014 | Kim | |

* cited by examiner

PROCESS FOR THE ADJUSTMENT OF BACKLASH BETWEEN A PINON AND A RACK IN A RACK-PINION DRIVE

This application is a U.S. national phase application under 35 U.S.C. of § 371 of International Application No. PCT/EP2020/070700, filed Jul. 22, 2020, which claims priority to European Patent Application No. EP 19193843.0, filed Aug. 27, 2019, the disclosures of which are all hereby incorporated by reference herein.

The invention relates to a process for the adjustment of backlash between a pinon and a rack in a rack-pinion drive, a motor being operatively connected to the pinion via a gearbox, a motor-gearbox assembly including the motor and the gearbox being supported on a carrier via a positioning mechanism for precisely positioning the assembly in a radial position relative to the rack. The invention further relates to a rack-pinion drive and a software product for implementing the process.

BACKGROUND ART

Rack-pinion drives have been well known for decades. They allow for precise positioning along a linear axis. In order to allow precise positioning without having to employ a feedback loop, correcting the position along the linear axis based on position measurements, backlash in the drive train has to be minimized. This includes the minimization of backlash in the components of the drive train, in particular the gear box and the motor. It also includes the precise adjustment of the radial distance between the pinion and the rack, i. e. the distance along a direction which is perpendicular to the extension of the rack (axial direction, corresponding to the extension of the linear axis) as well as to the rotation axis of the pinion.

When adjusting the radial distance, aiming at minimizing the backlash between the pinion and the rack, one has to pay attention to the variation of backlash along the extension of the rack, which may be considerable. This is due to imperfect parallelism of the linear guide and the rack, to deviations of the rack from a precisely straight shape as well as to the installation of the rack and the linear guide, respectively, on a machine frame. In addition there is a certain variation of backlash along the circumference of the pinion as well.

These variations need to be taken into account in order to obtain optimum adjustment, i. e. minimum ("essentially zero") backlash with no tension between the rack and the pinion.

In the prior art, the user adjusting the rack-pinion drive is usually advised to first search for the "highest points" of the rack and of the pinion. The configuration where these highest points face each other is the one where the backlash is minimal. Once this configuration is found, the position of the pinion (including the gearbox and potentially the motor) is adjusted such that the backlash is essentially set to zero at this configuration. It will be the same or larger everywhere else along the rack.

Typically, in order to be able to adjust the radial distance, the position of a carrier for the motor-gearbox assembly is variable and the adjusted position may be fixed by tensioning several screws.

However, finding the highest points is a cumbersome process, involving considerable manual action, and fixing the motor-gearbox assembly may be difficult, especially if the assembly is not moved in a horizontal plane to adjust the distance between the pinion and the rack or if the assembly is bulky or heavy.

In order to facilitate the adjustment, WO 2017/216306 (Güdel Group AG) proposed a housing for a planetary gearbox having an output flange on the output side, wherein the output flange has a first lateral surface with circular symmetry in radial planes about an axis of symmetry and wherein the first lateral surface is arranged eccentrically with respect to the output axis of rotation. This means that the support and the housing of the planetary gearbox form a positioning mechanism including an eccentric support for the motor-gearbox assembly. A precise radial adjustment is obtained by rotating the housing of the planetary gearbox by an angle corresponding to a radial adjustment distance. The distance is fixed by locking the rotational degree of freedom of the housing, e. g. by a clamping ring.

This facilitates the adjustment itself, especially with heavy or bulky gearboxes and/or along a non-horizontal direction. Nevertheless, the prior determination of the highest points as described above is still required. Once these highest points are found, the adjustment distance may be derived from the circumferential backlash measured between the carriage supporting the gearbox-motor assembly and the rack, subtracting an output side backlash of the gearbox defined by the accuracy class of the gearbox. However, due to the fact that the actual backlash of a gearbox may be considerably smaller than indicated by the accuracy class, it is often the case that the remaining backlash between pinion and rack is larger than necessary.

SUMMARY OF THE INVENTION

It is therefore the object of the invention to simplify the process for adjustment of backlash between a pinion and a rack pertaining to the technical field initially mentioned.

The solution of the invention is specified by the features of the following process. According to the invention, the process comprises the following steps:
a) positioning the assembly in a first radial distance relative to the rack, using the positioning mechanism;
b) determining a first circumferential backlash between the pinon and the rack at a first position of the pinion along the rack, based on measurements taken on an input side of the gearbox;
c) positioning the assembly and/or the rack in a second position of the pinion along the rack, different from the first position;
d) determining a second circumferential backlash between the pinon and the rack at the second position, based on measurements taken on the input side of the gearbox;
e) determining a minimal circumferential backlash from the determined first circumferential backlash and the determined second circumferential backlash;
f) determining a radial adjustment distance based on the determined minimal circumferential backlash; and
g) repositioning the motor-gearbox assembly in a radial direction, towards the rack, by the determined radial adjustment distance, using the positioning mechanism.

Circumferential backlash values relate to rotation about an axis, e. g. of the pinion or of a motor drive shaft. They may be easily converted to linear backlash values (e. g. along the rack) and vice versa, essentially by a projection step. Accordingly, for the present description, measuring and processing circumferential backlash values includes the measuring and processing of corresponding linear backlash values.

The radial distance may be adjusted manually. This is required only twice throughout the entire process, independent from the number of determinations of circumferential backlash, namely when positioning the assembly in the first radial distance and when finally repositioning the assembly according to the determined radial adjustment distance. Nevertheless, in principle it is possible to have automatic adjustment of the radial distance by employing a corresponding drive, e. g. a small servo motor.

The first radial distance is chosen such that the pinion and the rack mesh with each other along the entire length of the rack and that at the same time there is no risk of blocking or creating tension between the pinion and the rack. Usually, a fixed offset of e. g. about 0.5 mm with respect to a nominal zero position leads to fulfilment of these requirements.

The relative positioning of the assembly and the rack, along the rack, may be obtained by moving a carriage carrying the motor-gearbox assembly with the pinion relative to a stationary rack. In other cases the motor-gearbox assembly with the pinion are mounted on a stationary support and the rack is linearly moved due to the rotation of the pinion. In even further cases, both the pinion and the rack are moved in opposite linear directions.

The steps c) and d) of positioning the assembly along the rack as well as of determining the circumferential backlash at the reached position may be repeated several times. Accordingly, for finding the minimal circumferential backlash, a number of determined values of circumferential backlash will have to be compared. Basically, the number of determinations is suitably chosen to ensure that the determined minimal circumferential backlash is close enough to the actual minimal circumferential backlash along the entire rack.

In particular, the determined minimal circumferential backlash is the minimum of the determined circumferential backlash values. In other embodiments, the minimal circumferential backlash may be obtained from an interpolation based on the determined circumferential backlash values and may be (slightly) smaller than the determined values based on actual measurements.

Using the inventive process, the step of determining the highest points of the rack and the pinion, respectively, is not required. Compared to the worst case scenario assumed in the context of the prior art methods, where the highest points of the rack and the pinion meet, using the inventive method closer distances between rack and pinion are possible because only the actually occurring interactions between the elements of the rack and of the pinion are taken into account. Furthermore, in contrast to the prior art approach, the inventive method is readily applicable to embodiments where two motor-gearbox assemblies each carrying a pinion are mounted to the same carrier, both of them interacting with the same rack.

A rack-pinion drive which may be used in the context of the inventive process comprises
 a) a rack;
 b) a motor-gearbox assembly comprising a motor and a gearbox;
 c) a pinion operatively connected to the motor-gearbox assembly;
 d) a carrier;
 e) a positioning mechanism arranged between the carrier and the motor-gearbox assembly for precisely positioning the assembly in a radial position relative to the rack;
 f) a measuring device for taking measurements on an input side of the gearbox;
 f) a first processor receiving data from the measuring device, the processor being configured to determine circumferential backlash between the pinion and the rack based on the received data;
 g) a first storage for storing circumferential backlash values determined by the processor;
 h) a comparator being configured to determine a minimal circumferential backlash from the stored circumferential backlash values; and
 i) a second processor receiving the minimal circumferential backlash from the comparator, the second processor being configured to determine a radial adjustment distance based on the determined minimal circumferential backlash.

The positioning mechanism may be mounted to the carrier and supporting the motor-gearbox. It may as well be independent from the actual support of the motor-gearbox and control the movements of the motor-gearbox relative to the carrier.

It is not required to employ a dedicated measuring device for taking the measurements on the input side of the gearbox. Instead, it is possible to use sensors or gauges that are already present in the motor-gearbox assembly or a controller therefor.

Similarly, the first and second processor as well as the first storage and the comparator may be embodied by the existing controller for the linear axis, running a respective computer program.

In a preferred embodiment of the inventive process, the assembly is automatically positioned by operating the motor. This allows for carrying out at least steps b)-f) (including repetitions of steps c) and d)) in a fully automated manner.

Correspondingly, the inventive rack-pinion drive preferably features a control device configured to control the motor to position the assembly and/or the rack in at least two different positions of the pinion along the rack and to control the measuring device to take at least one measurement in each of the at least two different positions.

Advantageously, the assembly is positioned in a number of positions of the pinion along the rack, along essentially an entire length of the rack. In particular, the number of positions is at least 5, particularly at least 10. Related to the linear extension of the rack, the number of positions is advantageously at least 3 per meter, particularly advantageous is a number of positions of at least 10 per meter. The positions may be chosen to be equidistant or the distances of neighbouring positions may be chosen to be different. It is also possible to employ a dynamic scheme for finding the minimum circumferential backlash, i. e. the next position is chosen based on backlash values already determined, with the goal of most efficiently finding the position along the rack where the backlash is minimal.

The positions preferably cover at least 70%, particularly at least 80%, of the rack (i. e. the distance between the leftmost position and the rightmost position is at least 80% of the total rack length).

Preferably, the radial adjustment distance is determined in such a way that in a position corresponding to the determined minimal circumferential backlash a configuration with a predetermined value of backlash is obtained. The predetermined value may be close to zero. A slightly positive value is advised in order to reliably exclude a pre-tensioning of the pinion with respect to the rack. (Slightly) negative values may be chosen if preload between the pinion and the rack is desired.

Preferably, the measurements taken on the input side of the gearbox are torque and/or power measurements taken at the motor. At (essentially) constant voltage, the power measurements correspond to measurements of the electrical current drawn by the motor. Variations of power (or current) relate to variations in torque, caused e. g. by a tooth of the pinion and a tooth of the rack. Such measurements may be easily processed automatically, by electronic processing means. Corresponding measuring devices are cost-efficient and reliable.

In alternative embodiments, the measurements are taken using mechanical means. As an example, rotary encoders may be employed or even disk-like read-out systems for manual use.

In a preferred embodiment, the positioning mechanism includes an eccentric support for the motor-gearbox assembly, wherein a precise radial adjustment is obtained by rotating the motor-gearbox assembly by an angle corresponding to the radial adjustment distance. Corresponding positioning mechanisms are disclosed in WO 2017/216306 A1 (Güdel Group AG), the content of which being incorporated by reference. Furthermore, corresponding mechanisms are commercially available from the applicant Güdel Group AG (NGHP type planetary gearboxes).

It is advantageous if the eccentric support features a scale, which allows for manually moving the motor-gearbox assembly along a desired distance in the radial direction. This may be the radial adjustment distance obtained from the inventive process.

This eccentric support allows for easy and precise radial adjustment, even in cases where the motor-gearbox assembly is heavy and or bulky or where the adjustment direction is off-horizontal.

Preferably, a total backlash of a drivetrain including at least the rack, the pinion and the gearbox is determined from the measurements taken on the input side of the gearbox and the circumferential backlash is determined from the total backlash by subtracting a gearbox backlash from the total backlash based on individual part-specific data relating to the drivetrain, in particular to the gearbox.

Correspondingly, the inventive rack-pinion drive preferably comprises a second storage for storing individual part-specific data relating to the drivetrain, in particular to the gearbox, and the first processor is configured to subtract a gearbox backlash from the total backlash based on the individual part-specific data.

The individual part-specific data relates to the specific individual component(s) of the drivetrain employed.

Advantageously, the data relates to the input side of the drivetrain. This facilitates the subtraction from the measurements that are also taken on the input side of the gearbox. Most preferably, the data includes the following:
a) with respect to the gearbox, in particular a planetary gearbox, and pinion:
   idle torque at the input side;
   backlash at the input side (with blocked output);
   concentricity values of the installed output pinion (optically measured);
b) with respect to the rack:
   tooth thickness (based on pin measurements) of each tooth;
   single pitch of each tooth.

The specific data relating to the actual item is provided to the user. It will be used in the inventive process for determining the circumferential backlash from the measured total backlash.

Preferably, that the total backlash is determined by rotating the pinion, with the carrier held in a fixed position along the rack, in a first direction until a first flank of a tooth of the rack is touched and in a second direction until a second flank of a tooth of the rack is touched. The rotation angle between the two touching positions corresponds to the total backlash of the drivetrain.

In a preferred embodiment, for rotating the pinion a motor torque is chosen that exceeds an idle torque with static friction of the gearbox and that falls below an idle torque with static friction of the drivetrain. This ensures that the carrier is held in a fixed position. The torque may be chosen based on the individual part-specific data relating to the gearbox and (optionally) to further components of the drivetrain. Alternatively, the torque is chosen based on general information relating to the type of gearbox used as an analysis has shown that the idle torque of the entire rack pinion drive train is substantially higher than the idle torque of the gearbox only.

Alternatively, instead of accordingly choosing the motor torque, the carrier may be fixed in its position along the rack by other means, e. g. mechanical brakes or fixation means.

Based on the first circumferential backlash and the second circumferential backlash, a measure for a mounting precision of the rack may be determined. The determined measure may be outputted, e. g. displayed or forwarded to a processor for further processing.

The mechanical precision of a rack-pinion drive is determined on one hand by the precision of the components (rack, pinion and gearbox; linear guideway system) themselves but on the other hand also by the machining precision of the machine frame the drive is mounted to, as well as the precision of the mounting itself during assembly of the machine. Of particular importance is the parallelism of the rack relative to the linear guide.

The mechanical tolerances of the components are usually known. Accordingly, if the backlash values indicate that the total deviations exceed these mechanical tolerances, at least the exceeding portion may be assigned to the mounting of the components.

Analyzing the characteristics of the backlash values an even better differentiation between effects caused by component imprecisions and effects caused by mounting imprecisions or frame machining imprecisions may be achieved.

It has been found that by analyzing the backlash values taken at different positions along the rack, meaningful information on the mounting precision may be systematically obtained. In particular, the measure is obtained from more than two values of circumferential backlash obtained from numerous positions along the rack. The measure may be obtained directly from the circumferential backlash values and/or from values that have been derived from these circumferential backlash values.

It is not only possible to obtain a general measure for mounting precision of the entire rack-pinion drive but also to obtain local measures indicating the precision in respective regions of the rack. As an example, mounting flaws may be assigned to individual segments of a rack consisting of a number of individual rack segments. The precision may be measured after initial assembly of the machine but also at a later stage, to reassess the precision after a certain period of time in operation.

A software product according to the invention comprises the instructions for implementing the inventive process.

Other advantageous embodiments and combinations of features come out from the detailed description below and the entirety of the claims.

BRIEF DESCRIPTION OF THE DRAWINGS

The drawings used to explain the embodiments show.

In the figures, the same components are given the same reference symbols.

PREFERRED EMBODIMENTS

Figure 1:
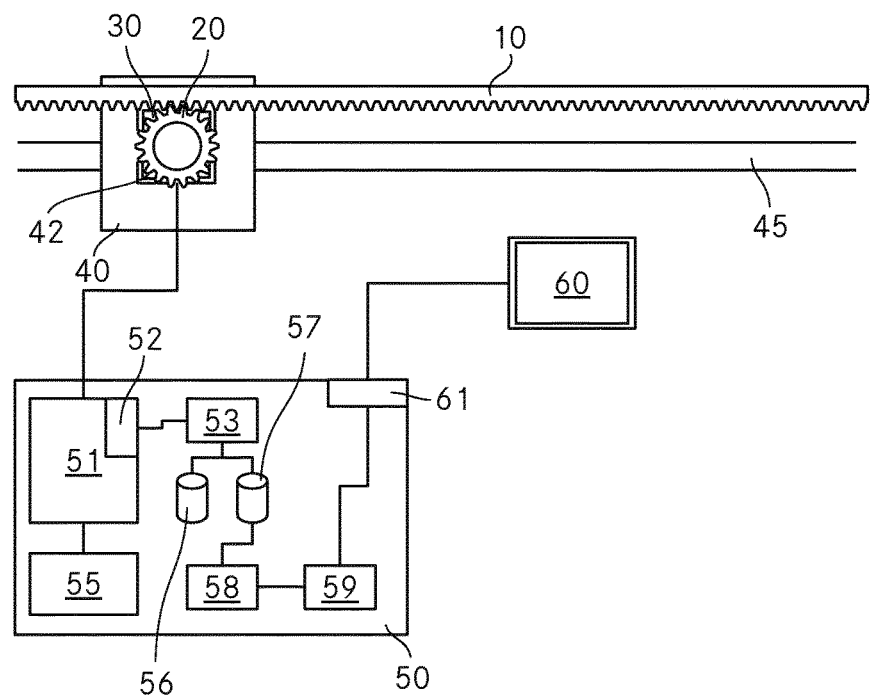
FIG. 1 A schematic representation of a rack pinion drive according to the invention.

The FIG. 1 is a schematic representation of a rack pinion drive according to the invention. It comprises a rack 10 meshing with a pinion 20. The pinion 20 is driven by a motor-gearbox assembly 30 including an electric drive motor and a planetary gearbox. In a manner known as such, the motor-gearbox assembly 30 is mounted on a carriage 40 (as a carrier for the motor-gearbox assembly), linearly displaceable along the rack 10 on a linear guide 45. The motor-gearbox assembly 30 is mounted to the carriage by a positioning mechanism 42 allowing for precisely positioning the assembly in a radial position relative to the rack 10. Suitable positioning mechanisms 42 include an eccentric support for the motor-gearbox assembly 30, wherein a precise radial adjustment is obtained by rotating the motor-gearbox assembly 30 by an angle corresponding to the radial adjustment distance. As mentioned above, such mechanisms are disclosed in WO 2017/216306 A1 (Güdel Group AG). They are commercially available from the applicant Güdel Group AG (NGHP type planetary gearboxes).

Operation of the rack pinion drive, in particular of the motor of the motor-gearbox assembly 30, is controlled by a control system 50. The control system 50 comprises a power source 51 for driving the motor. The power source 51 includes a current sensing circuit 52 providing accurate real-time information on the current drawn by the motor.

The control system 50 further comprises a first processor 53 receiving data from the current sensing circuit 52. The first processor 53 is connected to a central controller 55 for controlling the operation of the motor by means of the power source 51. As described in more detail below, in a backlash determination mode the first processor 53 controls the motor to drive the carriage 40 along the rack 10. Based on the current drawn by the motor and sensed by the current sensing circuit 52 the power required by the motor at a certain point in time and at a certain position of the carriage 40 along the rack 10 is obtained and based on the power values a total backlash of the drivetrain including the rack 10, the pinion 20 and the motor-gearbox assembly 30 is determined.

The first processor 53 has access to a storage 56 for storing individual part-specific data relating to the drivetrain, in particular to the gearbox. Based on the total backlash determined from the power values and the drivetrain data, the circumferential backlash between the pinion 20 and the rack 10 is determined and stored in a further storage 57.

Controlled by the central controller 55, the carriage is automatically moved along the rack 10 and determination of the circumferential backlash is repeated at different positions. All values are stored in storage 57. In a further step, a comparator 58 determines a minimum value of the stored backlash values and feeds this value to a second processor 59. Based on the minimum value as well as geometric parameters relating to the drivetrain, in particular to the module of the rack pinion drive, the second processor 59 determines a radial adjustment distance. The value of the adjustment distance is displayed on a display 60. For that purpose, the second processor 59 controls a display interface 61 of the control system 50.

Figure 2:
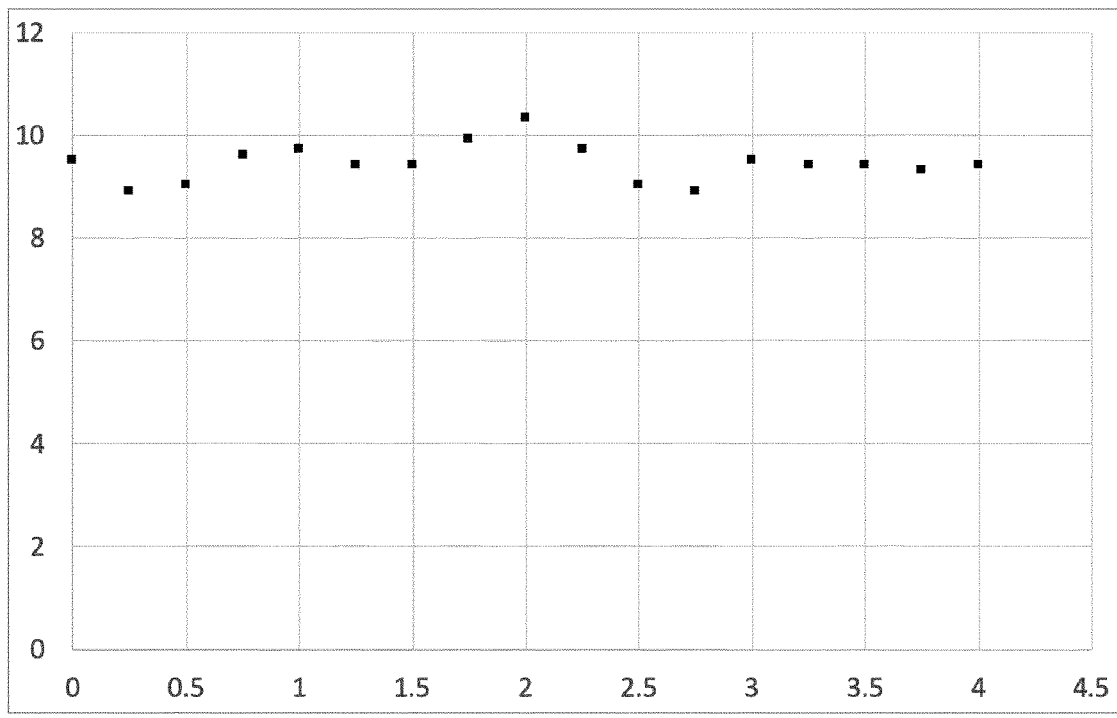
FIG. 2 a representation of measurements of the total backlash of the drivetrain, including the rack, the pinion and the gearbox.

The FIG. 2 is a representation of measurements of the total backlash of the drivetrain, including the rack, the pinion and the gearbox. The measurements have been taken at equidistant positions along the rack 10. The horizontal axis measures travel along the linear axis, the vertical axis measures the total circumferential backlash. For simplicity, the quantities are measured in arbitrary units (typical backlash values are in the range of e. g. 25-100 μm).

In the case shown, the values of the total backlash are between 8.9 and 10.3.

For obtaining the values shown in FIG. 2, the pinion 20 is adjusted to assume a first radial distance from the rack 10, wherein the distance is chosen such that the pinion 20 and the rack 10 mesh with each other along the entire length of the rack 10 and that at the same time there is no risk of blocking or creating tension between the pinion 20 and the rack 10. Adjusting the radial position is achieved by the positioning mechanism 42, e. g. by rotating the motor-gearbox assembly in a corresponding rotational position.

Figure 3:
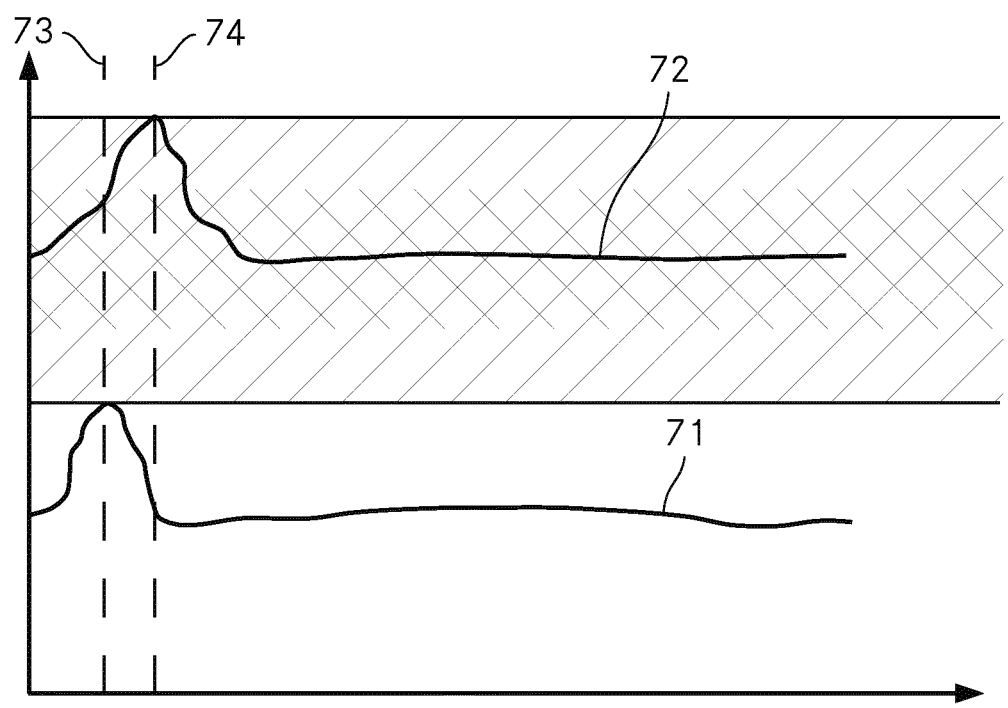
FIG. 3 a representation of motor torque values against time when energizing the motor of the rack pinion drive.

The FIG. 3 represents motor torque values (vertical axis) against time (horizontal axis) when energizing the motor. The lower curve 71 with smaller torque values describes the idle torque of the gearbox. Due to static friction, the torque is increasing to a maximum (line 73) from standstill. As soon as the pinion starts to rotate, i. e. static friction is overcome, the torque falls back to a smaller value (dynamic friction). Corresponding values for the individual gearbox may be provided among the part-specific data. The upper curve 72 with larger torque values describes the idle torque of the linear axis (i. e. the entire drivetrain including the gearbox, rack and pinion). Again, due to static friction, the torque is increasing to a maximum (line 74) from standstill. As soon as the carriage starts to move, i. e. static friction is overcome, the torque falls back to a smaller value (dynamic friction). As can be seen from FIG. 3, the torque values relating to the entire drivetrain are substantially larger than those relating to the gearbox only.

The values are measured by slowly rotating the pinion 20, employing a motor torque that is chosen to exceed the idle torque (with static friction) of the gearbox and to fall below the idle torque (with static friction) of the linear axis (i. e. the entire drivetrain including the rack and pinion) (dashed region in FIG. 3; in practice a value in a smaller range, shown by cross-dashing in FIG. 3 will be chosen in order to ensure safe operation). This ensures that the pinion is moved and that the position of the carriage 40 along the rack 10 will not move. In this way, the positions where the relevant tooth of the pinion 20 touches the left and right flank of the teeth of the rack 10, respectively, are determined. Touching of the flank is detected from an increase of the current drawn by the motor. The total circumferential backlash is easily obtained from the difference between the two determined positions.

The carriage 40 is moved to a plurality of predetermined positions along the rack 10 using the motor and the measurement of the total backlash is repeated at each position, controlled by the central processor 55.

It is the aim of the described method to adjust the backlash between the pinion and the rack. Accordingly, the current backlash between the pinion and the rack is determined from the measured total backlash of the entire drivetrain, including in particular the gearbox in addition to the pinion and the rack. Accordingly, the backlash of the gearbox is subtracted from the total backlash as described in the following, in connection with FIGS. 3 and 4. In both these Figures, the horizontal axis measures travel along the linear axis and the vertical axis measures backlash.

Figure 4:
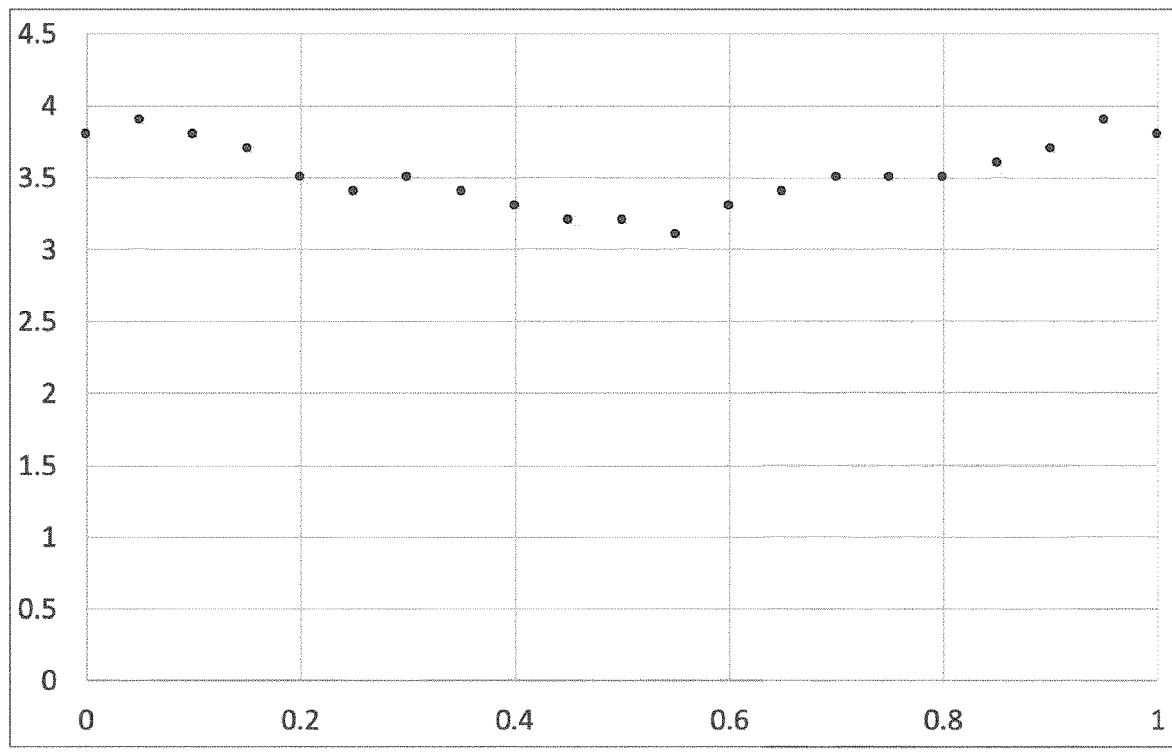
FIG. 4 a representation of the backlash of a specific gearbox along a full revolution of the output pinion.

The FIG. 4 is a representation of the backlash of a specific gearbox along a full revolution of the output pinion. The corresponding data is included by the individual part specific data stored in storage 56 and read by the first processor 53.

Figure 5:
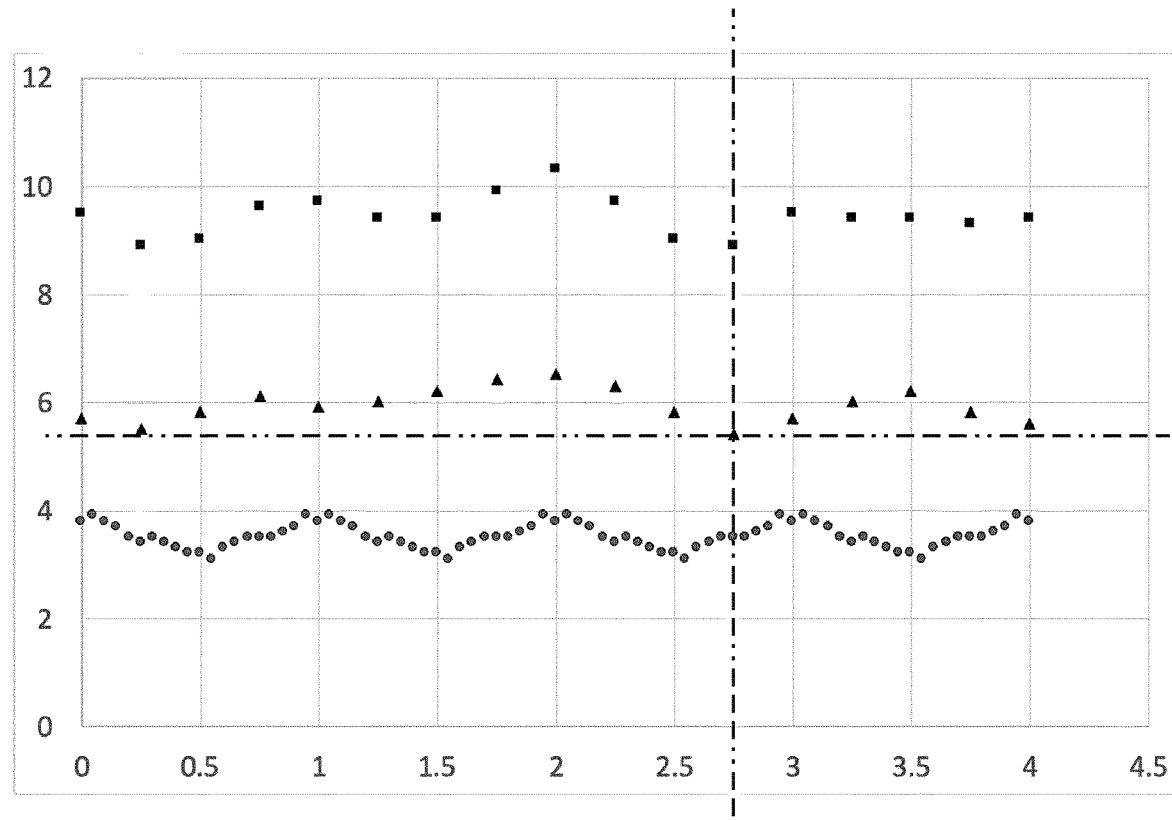
FIG. 5 representations of the total backlash, the gearbox backlash and the determined circumferential backlash.

The FIG. 5 represents the total backlash, the gearbox backlash and the determined circumferential backlash. The values of the gearbox backlash (round markers) correspond to the values shown in FIG. 3. They are repeated along the length of the rack 10, appropriately scaled to match the distance moved with each revolution of the pinion 20.

The values of the total backlash (square markers) correspond to those shown in FIG. 3, measured by the process described above.

The values of the rack-pinion backlash (triangular markers) are obtained by subtracting the gearbox backlash from the total backlash at each position where a total backlash measurement is available (4 values per revolution). The values of the rack-pinion backlash are stored in storage 57.

As can be seen from FIG. 5, the minimum rack-pinion backlash is 5.4, obtained at position 2.75 (again in arbitrary units). This is a position where the measured total backlash corresponds to that at another position (0.25), however the local gearbox backlash is larger at the rotational position of the pinion 20 assumed at position 2.75 than at position 0.25, and accordingly the remaining backlash of the rack and pinion is smaller at position 2.75. The minimum of the rack-pinion backlash is determined by the comparator 58. Its value is provided to the second processor 59. From this value, a radial adjustment distance is obtained, taking into account information on the geometry of the pinion and the rack. The radial adjustment distance is chosen such that in the position with the minimum backlash (at 2.75) the nominal calculated backlash amounts to a small value above zero. Accordingly, the backlash along the rack 10 is minimized, while at the same time avoiding any pre-tensioning of the pinion 20 with respect to the rack 10.

Based on the calculated radial adjustment distance, an instruction for adjusting the positioning mechanism 42 is provided to the user on the display 60. In particular, if the positioning mechanism 42 includes an eccentric support for the motor-gearbox assembly 30, the instruction relates to adjusting a rotational position for the motor-gearbox assembly 30 and may include an indication of a rotational value that can be found on a dial of the positioning mechanism 42. This value may be an offset value with respect to the current position or an absolute value if the current position is known or if it is predetermined (i. e. always the same, when performing the backlash measurements).

Accordingly, the user adjusts the radial distance and fixes the position and adjustment of the motor-gearbox assembly 30 with respect to the carriage 40. This concludes the adjustment process.

The invention is not limited to the described preferred embodiment. In particular, method steps that are carried out automatically in the context of the embodiment (such as repositioning the carriage and taking measurements) may be effected manually, and/or method steps that are carried out manually in the context of the embodiment (such as adjusting the radial distance) may be effected automatically. The components of the system and their interaction may be different from the described example. Furthermore, different positioning mechanisms may be employed for adjusting the radial distance.

In summary, it is to be noted that the invention provides a simple, reliable and accurate process for adjustment of backlash between a pinion and a rack.

We claim:

1. A process for the adjustment of backlash between a pinon and a rack in a rack-pinion drive, a motor being operatively connected to the pinion via a gearbox, a motor-gearbox assembly including the motor and the gearbox being supported on a carrier via a positioning mechanism for precisely positioning the assembly in a radial position relative to the rack, the process comprising the following steps:
 a) positioning the assembly in a first radial distance relative to the rack, using the positioning mechanism;
 b) determining a first circumferential backlash between the pinon and the rack at a first position of the pinion along the rack, based on measurements taken on an input side of the gearbox;
 c) positioning the assembly and/or the rack in a second position of the pinion along the rack, different from the first position;
 d) determining a second circumferential backlash between the pinon and the rack at the second position, based on measurements taken on the input side of the gearbox;
 e) determining a minimal circumferential backlash from the determined first circumferential backlash and the determined second circumferential backlash;
 f) determining a radial adjustment distance based on the determined minimal circumferential backlash; and
 g) repositioning the motor-gearbox assembly in a radial direction, towards the rack, by the determined radial adjustment distance, using the positioning mechanism.

2. The process as recited in claim 1, wherein the assembly is automatically positioned along the rack by operating the motor.

3. The process as recited in claim 2, wherein the assembly is positioned in a number of positions of the pinion along the rack, along essentially an entire length of the rack.

4. The process as recited in claim 1, wherein the radial adjustment distance is determined in such a way that in a position corresponding to the determined minimal circumferential backlash a configuration with a predetermined value of backlash is obtained.

5. The process as recited in claim 1, wherein the measurements taken on the input side of the gearbox are torque and/or power measurements taken at the motor.

6. The process as recited in claim 1, wherein the positioning mechanism includes an eccentric support for the motor-gearbox assembly, and wherein a precise radial adjustment is obtained by rotating the motor-gearbox assembly by an angle corresponding to the radial adjustment distance.

7. The process as recited in claim 1, wherein a total backlash of a drivetrain including at least the rack, the pinion and the gearbox is determined from the measurements taken on the input side of the gearbox and wherein the circumferential backlash is determined from the total backlash by subtracting a gearbox backlash from the total backlash based on individual part-specific data relating to the drivetrain.

8. The process as recited in claim 7, wherein the total backlash is determined by rotating the pinion, with the carrier held in a fixed position along the rack, in a first direction until a first flank of a tooth of the rack is touched and in a second direction until a second flank of a tooth of the rack is touched.

9. The process as claimed in claim 8, wherein for rotating the pinion a motor torque is chosen that exceeds an idle torque with static friction of the gearbox and that falls below an idle torque with static friction of the drivetrain, thus ensuring that the carrier is held in a fixed position.

10. The process as claimed in claim 1, wherein a measure for a mounting precision is determined from the first circumferential backlash and the second circumferential backlash and the determined measure is output.

\* \* \* \* \*